US012136252B2

(12) United States Patent
Yao et al.

(10) Patent No.: US 12,136,252 B2
(45) Date of Patent: Nov. 5, 2024

(54) LABEL ESTIMATION DEVICE, LABEL ESTIMATION METHOD, AND LABEL ESTIMATION PROGRAM

(71) Applicant: NIPPON TELEGRAPH AND TELEPHONE CORPORATION, Tokyo (JP)

(72) Inventors: Yasuhiro Yao, Tokyo (JP); Kazuhiko Murasaki, Tokyo (JP); Shingo Ando, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 362 days.

(21) Appl. No.: 17/628,071

(22) PCT Filed: Jul. 19, 2019

(86) PCT No.: PCT/JP2019/028472
§ 371 (c)(1),
(2) Date: Jan. 18, 2022

(87) PCT Pub. No.: WO2021/014495
PCT Pub. Date: Jan. 28, 2021

(65) Prior Publication Data
US 2022/0262097 A1  Aug. 18, 2022

(51) Int. Cl.
*G06K 9/00* (2022.01)
*G06V 10/764* (2022.01)
(Continued)

(52) U.S. Cl.
CPC ........ *G06V 10/764* (2022.01); *G06V 10/7747* (2022.01); *G06V 10/776* (2022.01)

(58) Field of Classification Search
CPC ........... G06N 20/00; G06N 3/08; G06N 7/01; G06N 20/10; G06N 3/045; G06N 5/01;
(Continued)

(56) References Cited

U.S. PATENT DOCUMENTS

| | | | |
|---|---|---|---|
| 2014/0270479 A1* | 9/2014 | Berestov | G06T 7/41 382/154 |
| 2015/0278603 A1* | 10/2015 | Boriah | G06V 20/13 382/103 |
| 2019/0385021 A1* | 12/2019 | Sasaki | G06V 10/7747 |

OTHER PUBLICATIONS

Guinard et al. (2017) "Weakly supervised segmentation-aided classification of urban scenes from 3D LiDAR pointclouds" ISPRS Workshop, Jun. 6, 2017.
(Continued)

*Primary Examiner* — Alex Kok S Liew

(57) ABSTRACT

A point group including a small number of points that have been assigned labels is taken as an input to assign labels to points that have not been assigned labels.
In a label estimation apparatus for estimating a label to be assigned to a point that has not been labeled using a label of a point that has been labeled among points included in a point group, a confidence derivation unit 103 takes a point that has not been labeled within a point group including a point that has been labeled and the point that has not been labeled as a target point and estimates a class of the target point and a likelihood indicating a confidence of an estimation result of the class from a set of points included in the point group, a priority derivation unit 104 obtains a distance between the target point and a point that has been assigned the same label as a label corresponding to the estimated class as a priority used to determine whether the estimated class is appropriate, and a label determination unit 105 determines whether the estimated class is appropriate using at least an index based on the distance.

18 Claims, 8 Drawing Sheets

(51) Int. Cl.
*G06V 10/774* (2022.01)
*G06V 10/776* (2022.01)

(58) Field of Classification Search
CPC ........ G06N 3/084; G06N 5/022; G06N 3/047; G06N 3/088; G06N 7/00; G06N 20/20; G06N 3/04; G06N 3/042; G06N 5/02; G06N 5/025; G06N 5/04; G06N 10/00; G06N 3/044; G06N 3/0464; G06N 3/048; G06N 3/0895; G06N 3/09; G06T 7/11; G06T 7/143; G06T 2207/20081; G06T 11/60; G06T 2207/10016; G06T 2207/10024; G06T 2207/20004; G06T 2207/20072; G06T 2207/20076; G06T 2207/20084; G06T 2207/20101; G06T 2207/30241; G06T 2207/30252; G06T 7/10; G06T 7/174; G06T 7/215; G06T 7/269; G06T 7/13; G06T 7/41; G06T 7/73

See application file for complete search history.

(56) References Cited

OTHER PUBLICATIONS

Qi et al. (2017) "PointNet++: Deep Hierarchical Feature Learning on Point Sets in a Metric Space" 31st Conference on Neural Information Processing Systems, Dec. 4, 2017.
Landrieu et al. (2018) "Large-Scale Point Cloud Semantic Segmentation with Superpoint Graphs" 2018 IEEE/CVF Conference on Computer Vision and Pattern Recognition, Jun. 18, 2018.

* cited by examiner

LABEL ESTIMATION DEVICE, LABEL ESTIMATION METHOD, AND LABEL ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2019/028472, filed on 19 Jul. 2019, the disclosure of which is hereby incorporated herein by reference in its entirety.

TECHNICAL FIELD

The disclosed technology relates to a label estimation apparatus, a label estimation method, and a label estimation program.

BACKGROUND ART

An item of data having three-dimensional (x, y, z) position information is called a three-dimensional point. Data consisting of a collection of such three-dimensional points is called a three-dimensional point group. The three-dimensional point group is data indicating geometric information of objects and can be acquired through measurement by a distance sensor or through reconstruction of three-dimensional information from an image.

When a three-dimensional point group is used, it is necessary to assign each three-dimensional point of the three-dimensional point group a label indicating which object the three-dimensional point belongs to. There are various methods for labeling, and examples of the methods include work requiring manual operation such as repetition of the task of removing a part of a point group and assigning a label while viewing the point group with a three-dimensional point group viewer.

In view of such a background, a technique has been proposed in which learning is performed based on labels assigned to a small number of three-dimensional points to assign labels to other three-dimensional points in a three-dimensional point group.

Here, a label is assigned to each three-dimensional point included in the three-dimensional point group, thus indicating information on which class (object type) the three-dimensional point is classified as. For example, when an outdoor three-dimensional point group is a target, there are classes such as ground, buildings, pillars, cables, and trees and each three-dimensional point is assigned a label indicating which class the three-dimensional point is classified as.

For example, Non Patent Literature 1 realizes labeling of an entire three-dimensional point group from a small number of labels using the following method. The features of linearity, planarity, scattering, and verticality for each point in the point group are derived from adjacent points. A classifier that classifies a small number of labeled points from the derived features is learned using a random forest. The point group is divided into small regions by extending edges in the point group using K-Nearest Neighbor and dividing the edges by graph cuts based on the derived features. Then, a label for a region is estimated by a conditional random field considering class estimation values of the features of points belonging to the region and the smoothness of the classes of adjacent regions.

The technique described in Non Patent Literature 1 constructs the classifier using the predefined features of linearity, planarity, scattering, and verticality, but cannot use features of a deep neural networks (DNN) acquired by deep learning with higher performance. It is generally known that classification by deep teaming has higher accuracy than classification by the random forest.

Techniques in which feature extraction and recognition by deep learning are performed to label a three-dimensional point group with high accuracy have also been proposed (NPLs 2 and 3). In the techniques described in NPLs 2 and 3, a three-dimensional point group in which all three-dimensional points have been assigned labels needs to be prepared as learning data. It is difficult to prepare the learning data because the labeling of a three-dimensional point group involves a large amount of manual operation as described above.

CITATION LIST

Non Patent Literature

NPL 1: Guinard, Stephane, and Loic Landrieu. "Weakly supervised segmentation-aided classification of urban scenes from 3D LiDAR point clouds." ISPRS Workshop 2017. 2017.

NPL 2: Qi, Charles Ruizhongtai, et al. "Pointnet++: Deep hierarchical feature learning on point sets in a metric space." Advances in Neural Information Processing Systems. 2017.

NPL 3: Landrieu, Loic, and Martin Simonovsky. "Large-scale point cloud semantic segmentation with superpoint graphs." Proceedings of the IEEE Conference on Computer Vision and Pattern Recognition. 2018.

SUMMARY OF THE INVENTION

Technical Problem

The disclosed technology has been made in view of the above points and it is an object of the disclosed technology to provide a label estimation apparatus, method, and program which takes a point group including a small number of points that have been assigned labels as an input to estimate labels for points that have not been assigned labels while making it possible to freely select a method for extracting features.

Means for Solving the Problem

One aspect of the present disclosure provides a label estimation apparatus for estimating a label to be assigned to a point that has not been labeled using a label of a point that has been labeled among points included in a point group, the label estimation apparatus including a confidence derivation unit configured to take a point that has not been labeled within a point group including a point that has been labeled and the point that has not been labeled as a target point and estimate a class of the target point and a likelihood indicating a confidence of an estimation result of the class from a set of points included in the point group, a priority derivation unit configured to obtain a distance between the target point and a point that has been assigned the same label as a label corresponding to the estimated class as a priority used to determine whether the estimated class is appropriate, and a label determination unit configured to determine whether the estimated class is appropriate using at least an index based on the distance.

Effects of the Invention

According to the disclosed technology, a point group including a small number of points that have been assigned labels can be taken as an input to estimate labels for points that have not been assigned labels while making it possible to freely select a method for extracting features.

DESCRIPTION OF EMBODIMENTS

Figure 1:
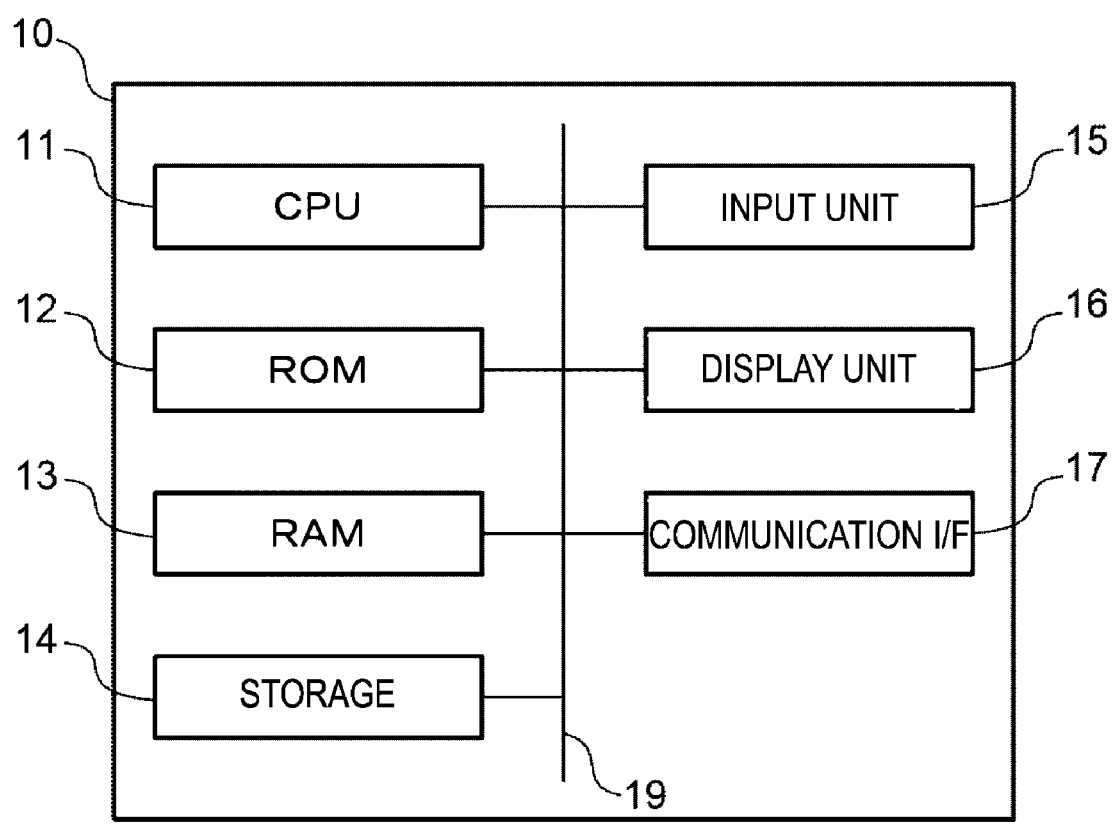
FIG. 1 is a block diagram illustrating a hardware configuration of a label estimation apparatus according to an embodiment of the present invention.

Hereinafter, an example of an embodiment of the disclosed technology will be described with reference to the drawings. The same or equivalent components and parts are denoted by the same reference signs in each drawing. The dimensional ratios in the drawings are exaggerated for convenience of explanation and may differ from the actual ratios.

FIG. 1 is a block diagram illustrating a hardware configuration of a label estimation apparatus 10.

As illustrated in FIG. 1, the label estimation apparatus 10 includes a central processing unit (CPU) 11, a read only memory (ROM) 12, a random access memory (RAM) 13, a storage 14, an input unit 15, a display unit 16, and a communication interface (I/F) 17. The components are communicatively connected to each other via a bus 19.

The CPU 11 is a central arithmetic processing unit, executes various programs, and controls each part. That is, the CPU 11 reads a program from the ROM 12 or the storage 14 and executes the program using the RAM 13 as a work area. The CPU 11 controls each of the components described above and performs various arithmetic processing according to programs stored in the ROM 12 or the storage 14. In the present embodiment, the ROM 12 or the storage 14 stores a label estimation program for executing a label estimation process which will be described later.

The ROM 12 stores various programs and various data. The RAM 13 temporarily stores a program or data as a work area. The storage 14 includes a hard disk drive (HDD) or a solid state drive (SSD) and stores various programs including an operating system and various data.

The input unit 15 includes a pointing device such as a mouse and a keyboard and is used to perform various input operations.

The display unit 16 is, for example, a liquid crystal display and displays various types of information. The display unit 16 may adopt a touch panel method and function as an input unit 15.

The communication I/F 17 is an interface for communicating with other devices and uses standards such as, for example, Ethernet (trade name), FDDI, and Wi-Fi (trade name).

Next, functional components of the label estimation apparatus 10 will be described.

Figure 2:
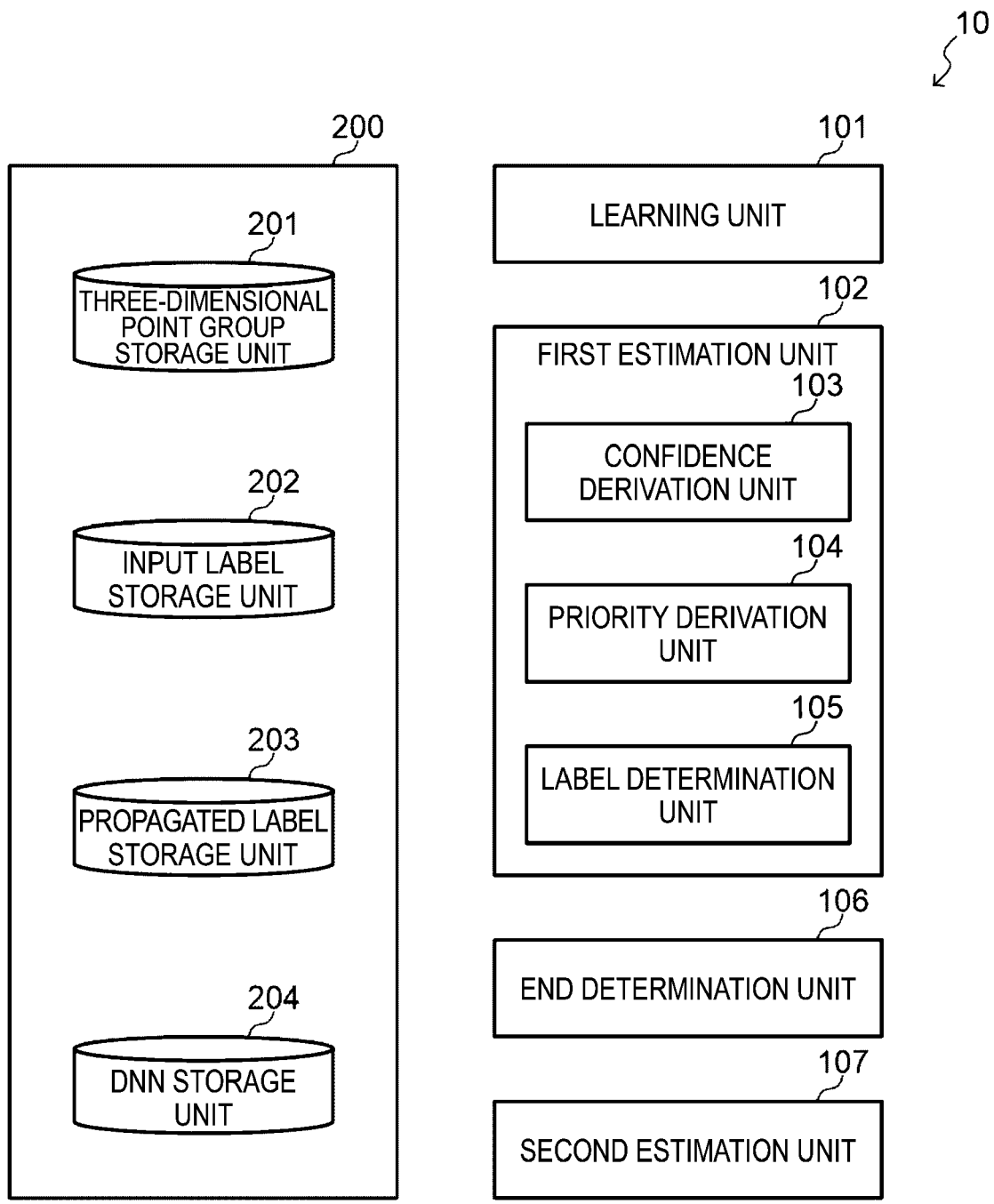
FIG. 2 is a block diagram illustrating an example of functional components of the label estimation apparatus according to the present embodiment.

FIG. 2 is a block diagram illustrating an example of the functional components of the label estimation apparatus 10.

As illustrated in FIG. 2, the label estimation apparatus 10 includes a learning unit 101, a first estimation unit 102, an end determination unit 106, and a second estimation unit 107 as functional components. The storage unit 200 includes a three-dimensional point group storage unit 201, an input label storage unit 202, a propagated label storage unit 203, and a DNN storage unit 204. Each functional component is realized by the CPU 11 reading the label estimation program stored in the ROM 12 or the storage 14 and loading and executing the label estimation program into and in the RAM 13.

A three-dimensional point group is input to the label estimation apparatus 10. The three-dimensional point group is a plurality of three-dimensional points acquired through measurement by a distance sensor or through reconstruction of three-dimensional information from an image and includes a small number of three-dimensional points that have been assigned labels and three-dimensional points that have not been assigned labels. A label is information indicating which of a plurality of classes each three-dimensional point is classified as based on object identification or the like. In the following, labels that have been assigned to a small number of three-dimensional points in advance when a three-dimensional point group is input to the label estimation apparatus 10 are referred to as "input labels", and labels that the first estimation unit 102 which will be described later propagates and assigns to three-dimensional points that have not been assigned labels are referred to as "propagated labels".

Figure 3:
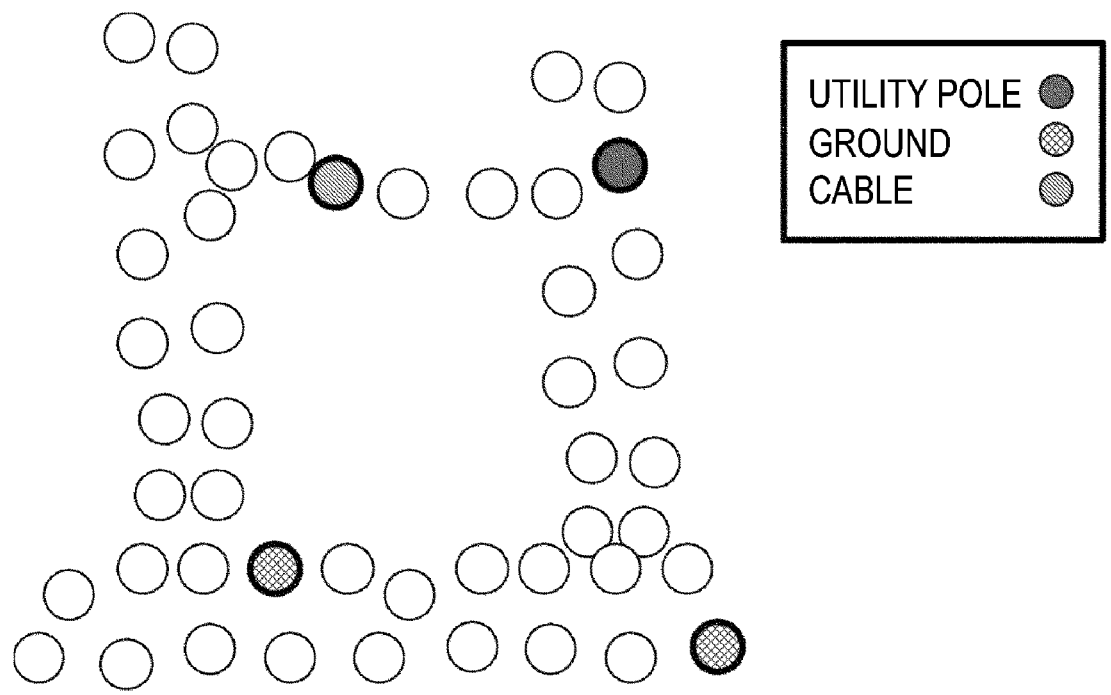
FIG. 3 is a diagram schematically illustrating an example of a three-dimensional point group that is input to the label estimation apparatus.

FIG. 3 schematically illustrates an example of a three-dimensional point group that is input to the label estimation apparatus 10. In FIG. 3, circles indicate three-dimensional points, white circles indicate three-dimensional points that have not been assigned labels, shaded circles indicate three-dimensional points that have been assigned labels, and in particular, circles with thick outlines indicate that the assigned labels are input labels. FIG. 3 illustrates an example of identifying objects in three classes of "utility pole", "ground", and "cable", where labels indicating the classes are shown with different types of shading. The same applies to the following figures.

The three-dimensional point group storage unit 201 stores three-dimensional coordinates (x, y, z) of three-dimensional points included in the three-dimensional point group input to the label estimation apparatus 10 in association with identification information of the three-dimensional points (hereinafter referred to as "three-dimensional point IDs").

The input label storage unit 202 stores three-dimensional IDs of three-dimensional points that have been assigned input labels and the input labels in association with each other. The propagated label storage unit 203 stores three-dimensional IDs of three-dimensional points that have been assigned propagated labels and the propagated labels in association with each other. The DNN storage unit 204 stores a DNN model deeply learned by the learning unit 101 which will be described later.

The learning unit 101 learns a model that derives a likelihood that an input three-dimensional point is classified as each of a plurality of classes (hereinafter referred to as a "class likelihood") while associating coordinates of each of a plurality of three-dimensional points with a label indicating which class each of the plurality of three-dimensional points belongs to. The class likelihood is a vector having a dimensionality of the number of classes. The values of the elements of the vector may be constrained such that the sum of the class likelihoods is 1 or may not be constrained on the sum of the class likelihoods. The present embodiment will be described with reference to the case where the values of the elements of the vector are constrained such that the sum of the class likelihoods is 1. In the following, a class with the highest class likelihood is referred to as an "estimated class".

Specifically, the learning unit 101 performs DNN learning using the coordinates of three-dimensional points stored in the three-dimensional point group storage unit 201, input labels stored in the input label storage unit 202, and propagated labels stored in the propagated label storage unit 203 as inputs. In an initial state of the deep learning of the learning unit 101, the propagated labels are empty, and the learning unit 101 learns a DNN only with three-dimensional points that have been assigned input labels. The learning unit 101 stores the DNN obtained as a result of the learning in the DNN storage unit 204 as a DNN model.

For example, a configuration based on a PointNet of Reference 1 can be used for the architecture of deep learning. In this configuration, the DNN takes the three-dimensional coordinates of a three-dimensional point group as an input and includes a T-Net layer, a pointwise mlp layer, a global feature extraction layer, and a classification layer. The T-Net layer is a layer on which the three-dimensional coordinates of each input three-dimensional point is three-dimensionally geometrically transformed. The pointwise mlp layer is a layer on which a multi-layer perceptron (mlp) is applied to each three-dimensional point to extract features of each three-dimensional point. The global feature extraction layer is a layer on which the features of three-dimensional points are integrated to extract overall features of the three-dimensional point group input to the DNN through a feature extraction process. The classification layer is a layer on which the overall features of the three-dimensional point group input to the DNN is processed with the mlp and soft-max to estimate a class likelihood of each three-dimensional point.

Reference 1: Qi, Charles R., et al., "Pointnet: Deep learning on point sets for 3d classification and segmentation." Proceedings of the IEEE Conference on Computer Vision and Pattern Recognition. 2017

Figure 4:
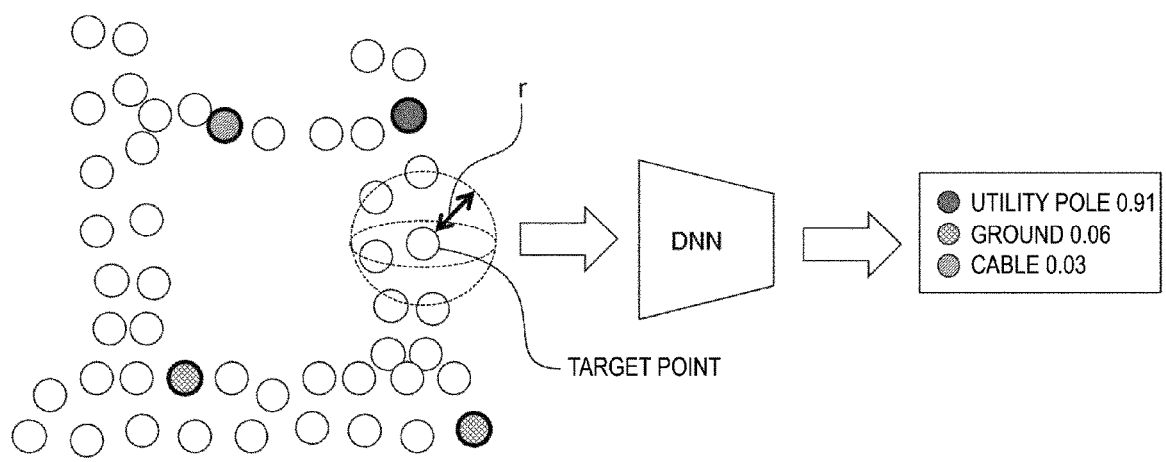
FIG. 4 is a diagram for explaining a three-dimensional point group to be input to a DNN.

As illustrated in FIG. 4, the learning unit 101 may extract a group of three-dimensional points included in a range of distance r from a three-dimensional point to be processed (hereinafter referred to as a "target point"), that is, a group of three-dimensional points included in a sphere having a radius r centered on the target point and then input it into the DNN, rather than inputting the three-dimensional point group stored in the three-dimensional point group storage unit 201 into the DNN as it is. This is to obtain a likelihood of the class of the target point by taking into account nearby properties of the target point. The nearby properties include, for example, a shape, while other properties are also taken into account depending on information included in the input three-dimensional point group. For example, in the case of a three-dimensional point group including color information, not only the shape but also color may be taken into account as properties. The learning unit 101 inputs the three-dimensional coordinates of the extracted three-dimensional point group into the DNN and derives a class likelihood of the target point.

The learning unit 101 takes a three-dimensional point that has already been assigned an input label or a propagated label as the target point to derive the class likelihood through the above-described method and learns the DNN to minimize a loss function for the derived class likelihood. For example, a loss defined by the following equation (1) can be used as the loss function.

[Math. 1]

$$loss = \begin{cases} -\left(\frac{N_p}{N_o}\sum_i^{N_o} L_o \log L_i + \sum_i^{N_p} L_p \log L_i\right), & N_p > 0 \\ -\sum_i^{N_o} L_o \log L_i, & N_p = 0 \end{cases} \quad (1)$$

In equation (1), No is the number of three-dimensional points that have been assigned input labels and $N_p$ is the number of three-dimensional points that have been assigned propagated labels. $L_0$ is an input label and $L_p$ is a propagated label, both of which are one-hot encoded k-dimensional vectors (where k is the number of classes). $L_i$ is a class likelihood derived by the DNN for an ith three-dimensional point and is a k-dimensional vector. $\log(L_i)$ means application of a logarithm to each dimension of $L_i$ to output a k-dimensional vector.

The first term of the loss indicated in equation (1) is a cross entropy evaluated for the No three-dimensional points that have been assigned input labels, and the second term is a cross entropy evaluated for the $N_p$ three-dimensional points that have been assigned propagated labels. The first term is weighted by $N_p$/No. This is applied to prevent learning with propagated labels from becoming dominant when $N_p$ becomes much greater than No as the number of propagated labels increases. That is, this indicates that the first and second terms are weighted such that the contributions of three-dimensional points that have been assigned input labels and three-dimensional points that have been assigned propagated labels to the loss function are equal.

The error index used in the loss function is required to be an index indicating an error between the class likelihood derived for the three-dimensional point and the class indicated by the assigned label, and is not limited to the cross entropy used in equation (1).

The learning unit 101 performs DNN learning based on the loss function until the learning converges. For example, the learning unit 101 can determine whether the learning has converged based on whether a change in the accuracy rate of the class derived for training data (three-dimensional points that have been assigned input labels and propagated labels) between epochs is less than a predetermined threshold. The method of determining the convergence is not limited to this example. When the learning of the DNN has converged, the learning unit 101 stores the DNN at that time in the DNN storage unit 204 as a DNN model.

When an index based on both a likelihood of an estimated class derived by the DNN for a target point that has not been assigned any label within a three-dimensional point group including three-dimensional points that have been assigned input labels or propagated labels and three-dimensional points that have not been assigned any labels and the distance and a distance between the target point and a three-dimensional point which is the closest to the target point among three-dimensional points that have been assigned labels indicating the estimated class satisfies a predetermined reference, the first estimation unit 102 propagates a label indicating the estimated class to the target point. Specifically, the first estimation unit 102 takes the three-dimensional point group, the input labels or propagated labels, and an index of the target point as inputs and outputs a label to be assigned to the target point.

More specifically, the first estimation unit 102 includes a confidence derivation unit 103, a priority derivation unit 104, and a label determination unit 105 as illustrated in FIG. 2. The confidence derivation unit 103 estimates the class of the target point using the learned model which has been learned by the learning unit 101 and outputs the estimated class together with a likelihood indicating the confidence of the estimation result. The priority derivation unit 104 outputs a priority used to determine whether the estimated class is appropriate. Specifically, the priority derivation unit 104 outputs the priority as a value which makes it easier to determine that the estimated class derived for the target point is appropriate as the distance between the target point and a point closest to the target point that has been assigned the same label as the label indicating the estimated class of the target point becomes shorter. This is to use the property that points that have been assigned the same label are likely to be present nearby in the real space. The label determination unit 105 uses at least one of the likelihood and the priority to determine the label to be propagated. Here, a class or a parameter obtained using another method may also be used for at least one of the likelihood and the priority. Determining a label can be rephrased as determining whether a class corresponding to a label is appropriate. Hereinafter, each of the confidence derivation unit 103, the priority derivation unit 104, and the label determination unit 105 will be described in more detail.

The confidence derivation unit 103 takes, as inputs, the three-dimensional coordinates of three-dimensional points stored in the three-dimensional point group storage unit 201, input labels stored in the input label storage unit 202, propagated labels stored in the propagated label storage unit 203, and the DNN model stored in the DNN storage unit 204. The confidence derivation unit 103 inputs a three-dimensional point that has been assigned neither an input label nor a propagated label within the three-dimensional point group as a target point and derives and outputs the confidence and a label indicating the estimated class.

Specifically, similar to when the above-described learning is performed, the confidence derivation unit 103 extracts a three-dimensional point group included in a sphere having the radius r centered on a target point which is a three-dimensional point that has been assigned neither an input label nor a propagated label and inputs the extracted three-dimensional point group to the DNN which is the learned model as illustrated in FIG. 4. At the time of this input, the confidence derivation unit 103 translates the three-dimensional coordinates of each of the extracted three-dimensional points to coordinates whose origin is the three-dimensional coordinates of the target point to normalize the three-dimensional coordinates that are input to the DNN. The confidence derivation unit 103 outputs a class having a maximum class likelihood derived by the DNN model as an estimated class for this input and outputs the class likelihood of the estimated class derived by the DNN model as a confidence conf. In the example of FIG. 4, the estimated class for the three-dimensional point which is the target point is "utility pole" and the confidence conf is "0.91."

The priority derivation unit 104 takes the three-dimensional point group, the input labels, the propagated labels, and the estimated class derived by the confidence derivation unit 103 as inputs and derives a priority for each three-dimensional point. Here, the priority derivation unit 104 also takes a three-dimensional point that has been assigned neither an input label nor a propagated label within the three-dimensional point group as a target point to derive the priority.

Figure 5:
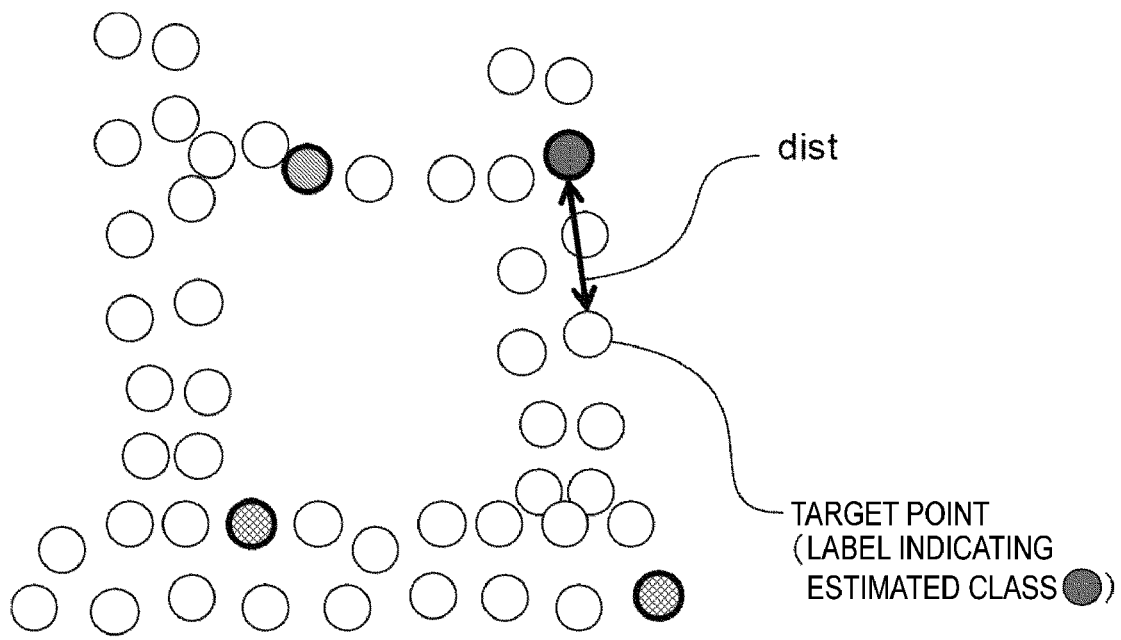
FIG. 5 is a diagram for explaining a distance dist used to derive a priority.

Specifically, as illustrated in FIG. 5, the priority derivation unit 104 sets, as dist, the distance between the target point and a three-dimensional point which is the closest to the target point among the three-dimensional points that have been assigned input labels or propagated labels indicating the same class as the estimated class of the target point. Then, the priority derivation unit 104 derives a priority $k_{dist}$ using the following equation (2).

[Math. 2]

$$k_{dist} = \begin{cases} \exp\left(-\dfrac{dist^2}{\sigma^2}\right), & dist \le R \\ t_{dist}, & dist > R \end{cases} \quad (2)$$

$$\sigma^2 = -\dfrac{R^2}{\log(t_{dist})}, \ 0 < t_{dist} < 1$$

In equation (2), σ is a value for making $k_{dist}$ continuous and $t_{dist}$ is a minimum value of $k_{dist}$. $k_{dist}$ is a continuous function of dist which increases with 1 as the maximum value as dist decreases and decreases as dist increases, but having a constant value of $t_{dist}$ when dist is greater than R. The priority $k_{dist}$ is set to a constant value when dist is greater than R, taking into consideration the fact that objects of the same class may be present spatially separated depending on the class. In this case, dist is great between three-dimensional points at distant positions even when the three-dimensional points are on the same object, such that the confidence is lowered. Thus, in order to prevent this situation, the priority $k_{dist}$ is set to a constant value when dist is greater than R.

The priority derivation unit 104 may also derive the priority $k_{dist}$ from a normal distribution having an arbitrary standard deviation σ' as shown in the following equation (3).

[Math. 3]

$$k_{dist} = \exp\left(-\dfrac{dist^2}{\sigma^2}\right) \quad (3)$$

A three-dimensional point group has a property that spatially adjacent three-dimensional points tend to have labels indicating the same class. The priority $k_{dist}$ uses this property to produce the effect of preferentially propagating a label from a three-dimensional point that has already been labeled to a spatially adjacent three-dimensional point.

Figure 6:
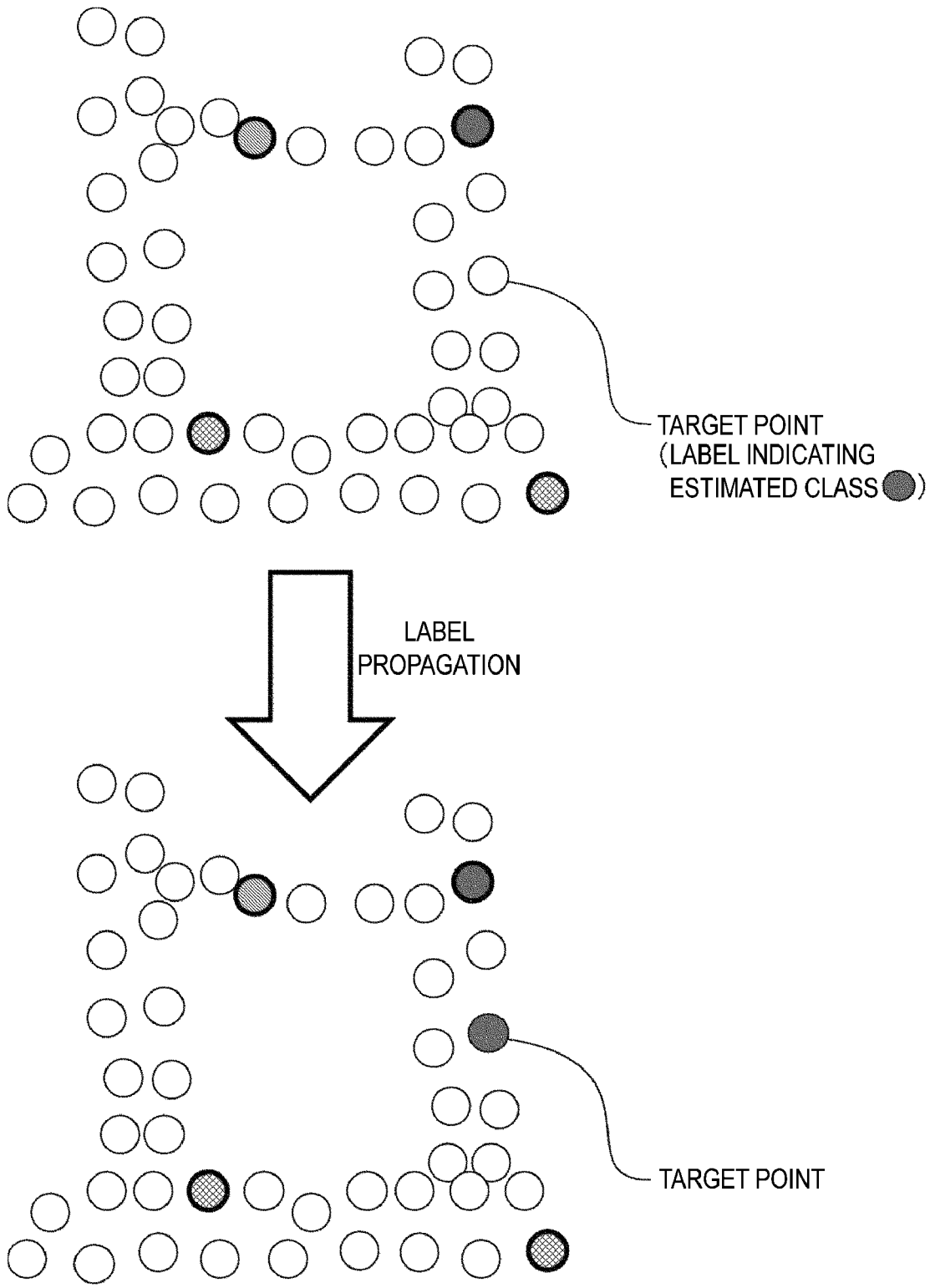
FIG. 6 is a diagram for explaining label propagation.

The label determination unit 105 determines that a class estimated for a three-dimensional point for which the product conf×$k_{dist}$ of the confidence conf and the priority $k_{dist}$ is equal to or greater than a threshold $t_{conf}$ is appropriate. Upon determining that the estimated class is appropriate, the label determination unit 105 assigns the three-dimensional point a label indicating the estimated class as a propagated label as illustrated in FIG. 6. Use of conf×$k_{dist}$ as an index enables propagation of a label from a three-dimensional point that has already been labeled to a three-dimensional point having close DNN features and spatially close to the three-dimensional point that has already been labeled. The sum of the confidence conf and the priority $k_{dist}$, a weighted sum, or the like may be used as the index, without being limited to the product of the confidence conf and the priority $k_{dist}$.

When there are few three-dimensional points whose conf×$k_{dist}$ is equal to or greater than the threshold $t_{conf}$, the label determination unit 105 may assign each three-dimensional point whose conf is greater than a threshold $t_{conf}'$, without taking into consideration $k_{dist}$, a label indicating an estimated class of the three three-dimensional point as a propagated label. This has the effect of being able to propagate a label to a three-dimensional point which is not spatially close but has high confidence in the class estimated by the DNN. A propagated label to be assigned may also be determined using at least one of conf and $k_{dist}$ as an index.

The label determination unit 105 stores the updated propagated label, that is, the newly assigned propagated label in the propagated label storage unit 203.

The learning unit 101 relearns the DNN using the propagated label updated by the first estimation unit 102 and the first estimation unit 102 performs label propagation using the relearned DNN. Such processing of the learning unit 101 and the first estimation unit 102 is repeated, such that labels are propagated and assigned to three-dimensional points that have not been assigned labels within the three-dimensional point group stored in the three-dimensional point group storage unit 201.

The end determination unit 106 determines to terminate the iterative processing of the learning unit 101 and the first estimation unit 102 when the proportion of three-dimensional points that have been assigned neither input labels nor propagated labels in the three-dimensional points stored in the three-dimensional point group storage unit 201 is less than a predetermined threshold (for example, 5%). The end determination unit 106 may also determine to terminate the iterative processing of the learning unit 101 and the first estimation unit 102 when the number of three-dimensional points that have been assigned propagated labels immediately previously by the first estimation unit 102 is less than a threshold.

The second estimation unit 107 estimates classes which three-dimensional points that have not been assigned labels at the time of the end determination of the end determination unit 106 are to be classified as. Specifically, the second estimation unit 107 reads the DNN model stored in the DNN storage unit 204, inputs each of the three-dimensional points that have not been assigned labels to the DNN as a target point, and estimates an estimated class derived by the DNN as the class of the three-dimensional point which is the target point. The second estimation unit 107 assigns a label indicating the estimated class to the three-dimensional point which is the target point.

Next, the operation of the label estimation apparatus 10 will be described.

Figure 7:
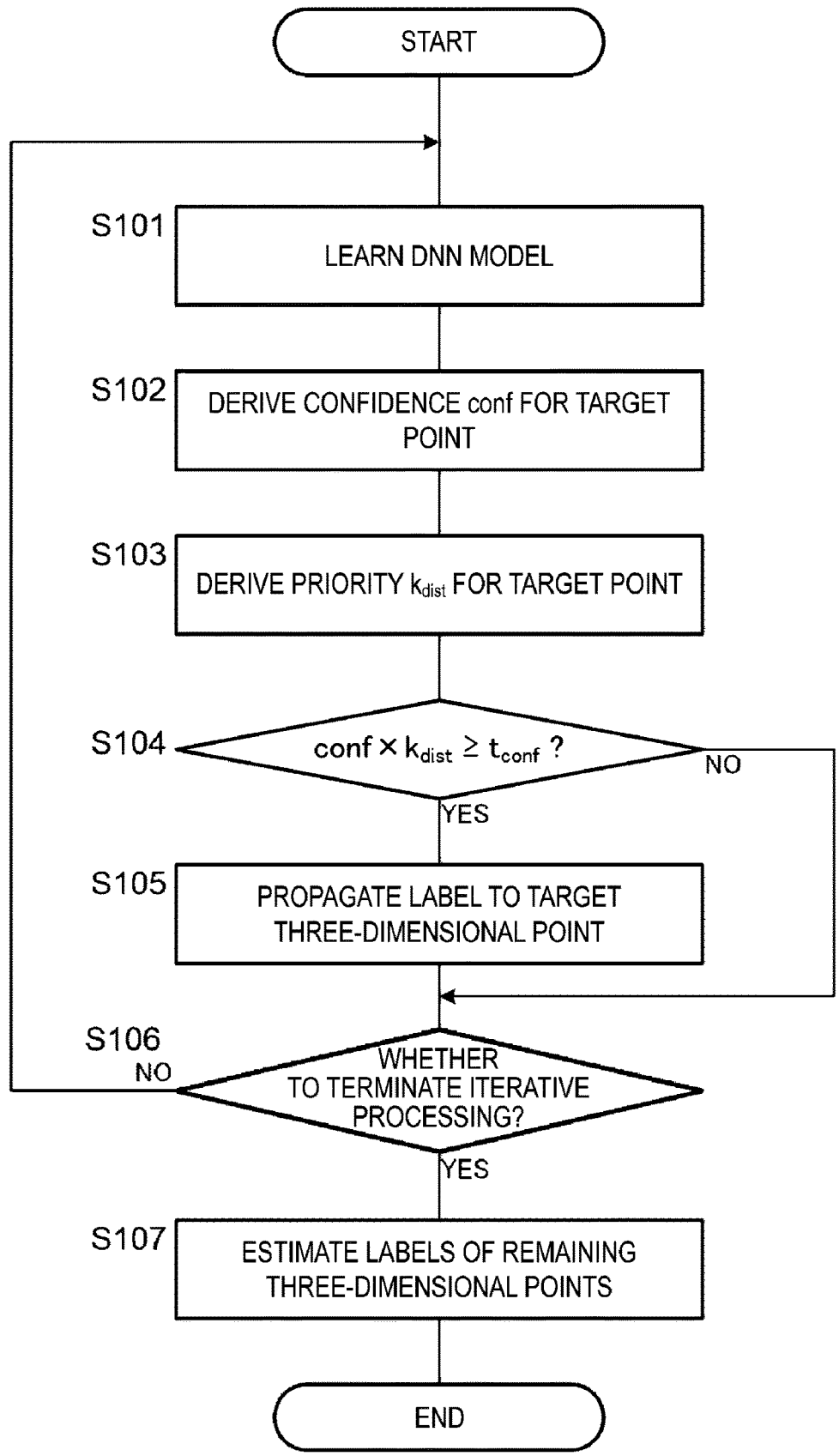
FIG. 7 is a flowchart illustrating a flow of a label propagation process in the present embodiment.

FIG. 7 is a flowchart illustrating a flow of the label estimation process performed by the label estimation apparatus 10. The label estimation process is performed by the CPU 11 reading the label estimation program from the ROM 12 or the storage 14 and loading and executing the label estimation program into and in the RAM 13.

In step S101, as the learning unit 101, the CPU 11 performs DNN learning using, as inputs, the three-dimensional coordinates of three-dimensional points stored in the three-dimensional point group storage unit 201, input labels stored in the input label storage unit 202, and propagated labels stored in the propagated label storage unit 203. As the learning unit 101, the CPU 11 stores a DNN obtained as a result of the learning in the DNN storage unit 204 as a DNN model.

Next, in step S102, as the confidence derivation unit 103, the CPU 11 sets each three-dimensional point that has been assigned neither an input label nor a propagated label within the three-dimensional point group as a target point. Then, as the confidence derivation unit 103, the CPU 11 inputs the three-dimensional coordinates of three-dimensional points included in a sphere having the radius r centered on the target point into the DNN and derives and outputs the likelihood of an estimated class for the target point as a confidence conf.

Next, in step S103, as the priority derivation unit 104, the CPU 11 sets the distance between the target point and a three-dimensional point which is the closest to the target point among the three-dimensional points that have been assigned input labels or propagated labels indicating the same class as the estimated class of the target point as dist. Then, as the priority derivation unit 104, the CPU 11 derives a priority $k_{dist}$ using the distance dist, for example, according to equation (2).

Next, in step S104, as the label determination unit 105, the CPU 11 determines whether the product conf×$k_{dist}$ of the confidence conf and the priority $k_{dist}$ is equal to or greater than a threshold $t_{conf}$. When conf×$k_{dist}$≥$t_{conf}$, the process proceeds to step S105.

In step S105, as the label determination unit 105, the CPU 11 assigns the three-dimensional point which is the target point a label indicating an estimated class of the three-dimensional point as a propagated label and stores the updated propagated label in the propagated label storage unit 203, and the process proceeds to step S106. On the other hand, when conf×$k_{dist}$<$t_{conf}$, the process skips step S105 and proceeds to step S106. The processing of steps S102 to S105 is executed for each target point.

In step S106, as the end determination unit 106, the CPU 11 determines whether to terminate the iterative processing of the learning unit 101 and the first estimation unit 102. When the iterative processing of the learning unit 101 and the first estimation unit 102 is to be terminated, the process proceeds to step S107, and when the iterative processing is not to be terminated, the process returns to step S101.

In step S107, as the second estimation unit 107, the CPU 11 inputs each three-dimensional point that has not been assigned a label to the DNN as a target point and estimates an estimated class derived by the DNN as a class of the three-dimensional point which is the target point. Then, as the second estimation unit 107, the CPU 11 assigns the three-dimensional point which is the target point a label indicating the estimated class and the label estimation process ends.

Figure 8:
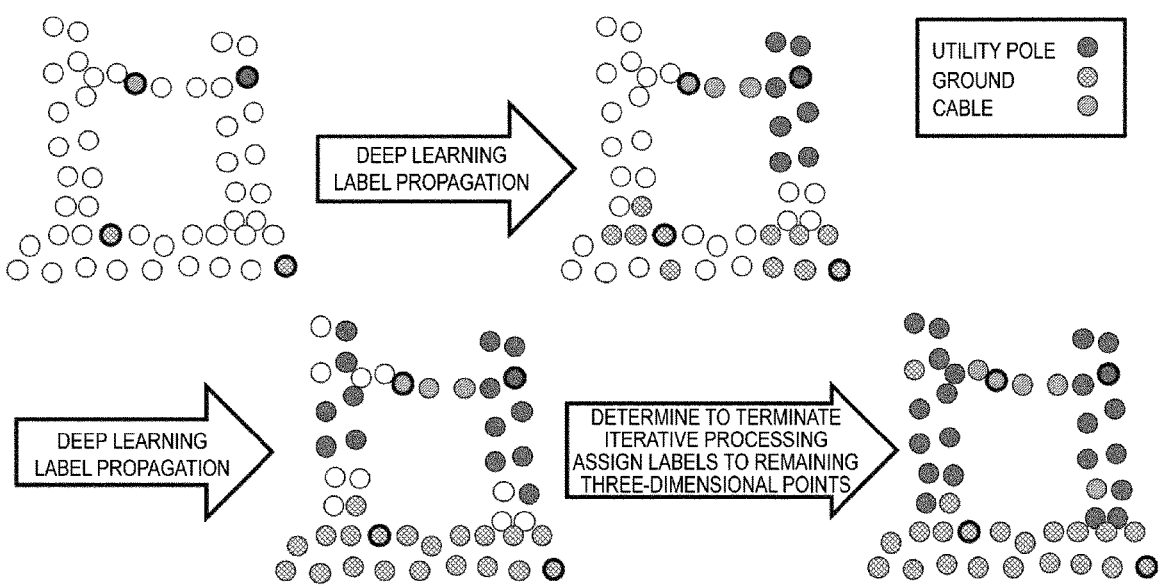
FIG. 8 is a diagram schematically illustrating how label propagation processing is performed.

By executing the above label estimation process, the model learning and the label propagation are repeated to assign labels to three-dimensional points which have been labeled, for example, as illustrated in FIG. 8. Then, when it is determined that the iterative processing is to be terminated, labels indicating estimated classes derived by the DNN are assigned to remaining three-dimensional points, such that all three-dimensional points are assigned labels.

As described above, the label estimation apparatus according to the present embodiment learns a model that derives a likelihood that an input three-dimensional point is classified as each of a plurality of classes while associating three-dimensional coordinates of each of a plurality of three-dimensional points with a label indicating which class each of the plurality of three-dimensional points is classified as, and when an index based on both the likelihood of an estimated class which is the highest of the likelihoods of estimated classes derived by the model for a target point which is a three-dimensional point that has not been assigned a label within a three-dimensional point group including three-dimensional points that have been assigned labels and three-dimensional points that have not been assigned labels and the distance between the target point and a three-dimensional point which is the closest to the target point among three-dimensional points that have been assigned labels indicating the estimated class satisfies a predetermined reference, propagates a label indicating an estimated class to the target point. Thus, labels for three-dimensional points that have not been assigned labels can be estimated by taking a three-dimensional point group including a small number of three-dimensional points that have been assigned labels as an input.

The above-described embodiment has been described with reference to the case where three-dimensional points that are still unlabeled with the iterative processing of the learning unit and the first estimation unit are assigned labels indicating estimated classes derived by the DNN, such that all three-dimensional points in the input three-dimensional point group are assigned labels. However, the present disclosure is not limited to this case and the remaining three-dimensional points may be assigned labels indicating classes estimated by a different method. Also, labels may be propagated to all remaining three-dimensional points by the first estimation unit or the process may be terminated with a small number of three-dimensional points remaining unlabeled. In this case, the configuration of the end determination unit and the second estimation unit in the above-described embodiment can be omitted.

The above-described embodiment has been described with reference to the case where the point group input to the label estimation apparatus is a three-dimensional point group, but the point group may be a two-dimensional point group without being limited to the three-dimensional point group.

The above-described embodiment has been described with reference to the case where the learning unit 101 and the first estimation unit 102 are constructed by the same computer. However, the learning unit 101 and the first estimation unit 102 may be realized by different computers. In this case, various information stored in the storage unit 200 can be shared between a computer constructing the learning unit 101 and a computer constructing the first estimation unit 102. The computer constructing the learning unit 101 can repeat DNN learning using information on propagated labels that have been propagated by the computer constructing the first estimation unit 102 and stored in the storage unit 200. The computer constructing the first estimation unit 102 can perform label estimation using the DNN model stored in the storage unit 200 each time the computer constructing the learning unit 101 performs iterative learning. The end determination unit 106 and the second estimation unit 107 may be constructed by the same computer as that of the first estimation unit 102 or may be constructed by different computers.

Further, the label propagation process executed by the CPU reading software (program) in the above embodiment may be executed together with various processors other than the CPU such as a graphics processing unit (GPU). Examples of such other processors also include a programmable logic device (PLD) whose circuit configuration can be changed after manufacturing such as a field-programmable gate array (FPGA) and a dedicated electric circuit which is a processor having a circuit configuration specially designed to execute specific processing such as an application specific integrated circuit (ASIC). The label propagation process may be executed by one of these various processors or may be executed by a combination of two or more processors of the same type or different types (such as, for example, a plurality of FPGAs or a combination of a CPU and an FPGA). A hardware structure of these various processors is, more specifically, an electric circuit that combines circuit elements such as semiconductor elements.

The above-described embodiment has been described with reference to an aspect in which the label propagation program is stored (installed) in the ROM 12 or the storage 14 in advance. However, the present disclosure is not limited to this. Programs may be provided in a form stored in a non-transitory storage medium such as a compact disc read only memory (CD-ROM), a digital versatile disc ROM (DVD-ROM), a universal serial bus (USB) memory, a magneto-optical disc, or a memory card. Programs may also be in a form downloaded from an external device via a network.

Regarding the above-described embodiment, the following supplements will further be disclosed.

Supplement 1

A label estimation apparatus includes:
a memory; and
at least one processor connected to the memory,
wherein the processor is configured to execute processing for estimating a label to be assigned to a point that has not been labeled using a label of a point that has been labeled among points included in a point group, the processing including:
taking a point that has not been labeled within a point group including a point that has been labeled and the point that has not been labeled as a target point and estimating a class of the target point and a likelihood indicating a confidence of an estimation result of the class from a set of points included in the point group;
obtaining a distance between the target point and a point that has been assigned the same label as a label corresponding to the estimated class as a priority used to determine whether the estimated class is appropriate; and
determining whether the estimated class is appropriate using at least an index based on the distance.

Supplement 2

A non-transitory recording medium storing a program that can be executed by a computer to perform a label estimation process of estimating a label to be assigned to a point that has not been labeled using a label of a point that has been labeled among points included in a point group, the label estimation process including:
taking a point that has not been labeled within a point group including a point that has been labeled and the point that has not been labeled as a target point and estimating a class of the target point and a likelihood indicating a confidence of an estimation result of the class from a set of points included in the point group;

obtaining a distance between the target point and a point that has been assigned the same label as a label corresponding to the estimated class as a priority used to determine whether the estimated class is appropriate; and determining whether the estimated class is appropriate using at least an index based on the distance.

REFERENCE SIGNS LIST

10 Label estimation apparatus
11 CPU
12 ROM
13 RAM
14 Storage
15 Input unit
16 Display unit
17 Communication I/F
19 Bus
101 Learning unit
102 First estimation unit
103 Confidence derivation unit
104 Priority derivation unit
105 Label determination unit
106 End determination unit
107 Second estimation unit
200 Storage unit
201 Three-dimensional point group storage unit
202 Input label storage unit
203 Propagated label storage unit
204 DNN storage unit

The invention claimed is:

1. A label estimation apparatus configured to estimate a label to be assigned to a point that has not been labeled using a label of a point that has been labeled among points included in a point group, the label estimation apparatus comprising circuit configured to execute a method comprising:

taking, as a target point, a point that has not been labeled within a point group including a point that has been labeled and the point that has not been labeled;

estimating a class of the target point and a likelihood indicating a confidence of an estimation result of the class from a set of points included in the point group;

obtaining a distance between the target point and a point that has been assigned the same label as a label corresponding to the estimated class as a priority used to determine whether the estimated class is appropriate; and determining whether the estimated class is appropriate using at least an index based on the distance, wherein the method further comprising:

learning a model that derives a likelihood that an input point is classified as each of a plurality of classes while associating a coordinate of each of a plurality of points with a label indicating which class each of the plurality of points is classified as, and learning the model to minimize a loss function, the loss function including a first term regarding an error for the point that has been labeled in advance and a second term regarding an error for the point that has been assigned the label indicating the class that has been determined to be appropriate and weighting the first and second terms such that contributions of the point that has been labeled in advance and the point that has been assigned the label indicating the class that has been determined to be equal.

2. The label estimation apparatus according to claim 1, wherein a set of points that is input to the obtaining includes only points present within a predetermined distance from the target point.

3. The label estimation apparatus according to claim 1, wherein the index based on the distance is designed such that it becomes easy to determine that the estimated class is appropriate as the distance decreases.

4. The label estimation apparatus according to claim 1, the circuit further configured to execute a method comprising:

determining whether the class is appropriate based on the index based on the distance and the likelihood.

5. The label estimation apparatus according to claim 1, the circuit further configured to execute a method comprising:

repeating learning of the model using coordinates of a point that has been labeled in advance and a point that has been assigned a label indicating a class that has been determined to be appropriate by the label determination unit; and repeating estimation of the class and the likelihood of the target point using the model learned by iterative processing.

6. A label estimation method for estimating a label to be assigned to a point that has not been labeled using a label of a point that has been labeled among points included in a point group, the label estimation method comprising:

taking a point that has not been labeled within a point group including a point that has been labeled and the point that has not been labeled as a target point and estimating a class of the target point and a likelihood indicating a confidence of an estimation result of the class from a set of points included in the point group;

obtaining a distance between the target point and a point that has been assigned the same label as a label corresponding to the estimated class as a priority used to determine whether the estimated class is appropriate; and determining whether the estimated class is appropriate using at least an index based on the distance, wherein the method further comprising:

learning a model that derives a likelihood that an input point is classified as each of a plurality of classes while associating a coordinate of each of a plurality of points with a label indicating which class each of the plurality of points is classified as, and learning the model to minimize a loss function, the loss function including a first term regarding an error for the point that has been labeled in advance and a second term regarding an error for the point that has been assigned the label indicating the class that has been determined to be appropriate and weighting the first and second terms such that contributions of the point that has been labeled in advance and the point that has been assigned the label indicating the class that has been determined to be equal.

7. A computer-readable non-transitory recording medium storing computer-executable label estimation program instructions that when executed by a processor cause a computer system to execute a method to estimate a label to be assigned to a point that has not been labeled using a label of a point that has been labeled among points included in a point group, comprising:

taking, as a target point, a point that has not been labeled within a point group including a point that has been labeled and the point that has not been labeled and estimate a class of the target point and a likelihood indicating a confidence of an estimation result of the class from a set of points included in the point group;

obtaining a distance between the target point and a point that has been assigned the same label as a label corresponding to the estimated class as a priority used to determine whether the estimated class is appropriate; and determining whether the estimated class is appropriate using at least an index based on the distance, wherein the method further comprising:

learning a model that derives a likelihood that an input point is classified as each of a plurality of classes while associating a coordinate of each of a plurality of points with a label indicating which class each of the plurality of points is classified as, and learning the model to minimize a loss function, the loss function including a first term regarding an error for the point that has been labeled in advance and a second term regarding an error for the point that has been assigned the label indicating the class that has been determined to be appropriate and weighting the first and second terms such that contributions of the point that has been labeled in advance and the point that has been assigned the label indicating the class that has been determined to be equal.

8. The label estimation apparatus according to claim 2, wherein the index based on the distance is designed such that it becomes easy to determine that the estimated class is appropriate as the distance decreases.

9. The label estimation method according to claim 6, wherein a set of points that is input to the obtaining includes only points present within a predetermined distance from the target point.

10. The label estimation method according to claim 6, wherein the index based on the distance is designed such that it becomes easy to determine that the estimated class is appropriate as the distance decreases.

11. The label estimation method according to claim 6, the method further comprising:

determining whether the class is appropriate based on the index based on the distance and the likelihood.

12. The label estimation method according to claim 7, the method further comprising:

repeating learning of the model using coordinates of a point that has been labeled in advance and a point that has been assigned a label indicating a class that has been determined to be appropriate by the label determination unit; and repeating estimation of the class and the likelihood of the target point using the model learned by iterative processing.

13. The computer-readable non-transitory recording medium according to claim 7, wherein a set of points that is input to the obtaining includes only points present within a predetermined distance from the target point.

14. The computer-readable non-transitory recording medium according to claim 7, wherein the index based on the distance is designed such that it becomes easy to determine that the estimated class is appropriate as the distance decreases.

15. The computer-readable non-transitory recording medium according to claim 7, the computer-executable program instructions when execute further causing the computer system to execute a method comprising:

determining whether the class is appropriate based on the index based on the distance and the likelihood.

16. The computer-readable non-transitory recording medium according to claim 7, the computer-executable program instructions when execute further causing the computer system to execute a method comprising:

repeating learning of the model using coordinates of a point that has been labeled in advance and a point that has been assigned a label indicating a class that has been determined to be appropriate by the label determination unit; and repeating estimation of the class and the likelihood of the target point using the model learned by iterative processing.

17. The label estimation method according to claim 9, wherein the index based on the distance is designed such that it becomes easy to determine that the estimated class is appropriate as the distance decreases.

18. The computer-readable non-transitory recording medium according to claim 16, the computer-executable program instructions when execute further causing the computer system to execute a method comprising:

learning the model to minimize a loss function, the loss function including a first term regarding an error for the point that has been labeled in advance and a second term regarding an error for the point that has been assigned the label indicating the class that has been determined to be appropriate by the label determination unit and weighting the first and second terms such that contributions of the point that has been labeled in advance and the point that has been assigned the label indicating the class that has been determined to be appropriate by the label determination unit are equal.

* * * * *